US007216593B2

(12) United States Patent
Capote et al.

(10) Patent No.: US 7,216,593 B2
(45) Date of Patent: May 15, 2007

(54) APPARATUS FOR TREATING LIQUID WASTE

(75) Inventors: Jose A. Capote, Kaohsiung (TW); Frank K. Menon, Round Lake, IL (US); Joseph A. Rosin, Northbrook, IL (US); Changjian Zhou, Cary, NC (US)

(73) Assignee: Peat International, Inc., Northbrook, IL (US)

( * ) Notice: Subject to any disclaimer, the term of this patent is extended or adjusted under 35 U.S.C. 154(b) by 0 days.

(21) Appl. No.: 11/271,573

(22) Filed: Nov. 12, 2005

(65) Prior Publication Data

US 2006/0065172 A1 Mar. 30, 2006

Related U.S. Application Data

(63) Continuation of application No. 10/820,651, filed on Apr. 8, 2004, now Pat. No. 6,971,323.

(60) Provisional application No. 60/554,879, filed on Mar. 19, 2004.

(51) Int. Cl.
*F23G 5/10* (2006.01)
(52) U.S. Cl. .................... 110/250; 110/165 R
(58) Field of Classification Search .......... 110/250, 110/121.36, 121.37, 121.38, 229, 165 R, 110/185, 186, 346, 342; 219/121.36, 121.37, 219/121.38
See application file for complete search history.

(56) References Cited

U.S. PATENT DOCUMENTS

| 3,622,493 A | 11/1971 | Crusco |
| 3,741,134 A | 6/1973 | Roberts et al. |
| 3,779,182 A | 12/1973 | Camacho |
| 3,841,239 A | 10/1974 | Nakamura |
| 4,181,504 A | 1/1980 | Camacho |
| 4,326,842 A | 4/1982 | Adachi et al. |
| 4,361,441 A | 11/1982 | Tylko |
| 4,438,706 A | 3/1984 | Boday et al. |
| 4,479,443 A | 10/1984 | Faldt et al. |
| 4,508,040 A | 4/1985 | Santén et al. |

(Continued)

FOREIGN PATENT DOCUMENTS

EP 0330872 9/1989

(Continued)

OTHER PUBLICATIONS

International Search Report for PCT Application No. PCT/2005/007904, Jun. 2005.

(Continued)

*Primary Examiner*—Kenneth B. Rinehart
(74) *Attorney, Agent, or Firm*—Brinks Hofer Gilson & Lione

(57) ABSTRACT

An apparatus for treating waste includes a vessel and DC and/or AC plasma torches with a variable flame mounted with the vessel. The flames generated by the torches can be adjusted depending on the characteristics of the waste being treated. Waste can be introduced into the vessel and heated with energy from the flame. The energy can melt or vitrify the inorganic portion of the waste and gasify and dissociate the organic portion of the waste. This dissociation can destroy the hazardous or toxic constituency of the waste.

11 Claims, 8 Drawing Sheets

U.S. PATENT DOCUMENTS

| | | |
|---|---|---|
| 4,615,285 A | 10/1986 | Bentell |
| 4,635,573 A | 1/1987 | Santén |
| 4,644,877 A | 2/1987 | Barton |
| 4,770,109 A | 9/1988 | Schlienger |
| 4,831,944 A | 5/1989 | Durand et al. |
| 4,886,001 A | 12/1989 | Chang et al. |
| 4,896,614 A | 1/1990 | Kulkarni |
| 4,980,092 A | 12/1990 | Pineau et al. |
| 4,989,522 A | 2/1991 | Cline et al. |
| 4,998,486 A | 3/1991 | Dighe et al. |
| 5,010,829 A | 4/1991 | Klukarni |
| 5,065,680 A | 11/1991 | Cheetham |
| 5,090,340 A | 2/1992 | Burgess |
| 5,095,828 A | 3/1992 | Holden et al. |
| 5,108,708 A | 4/1992 | Dummersdorf |
| 5,127,347 A | 7/1992 | Cheetham |
| 5,134,946 A | 8/1992 | Poovey |
| 5,143,000 A | 9/1992 | Camacho |
| 5,206,879 A | 4/1993 | Moody et al. |
| 5,222,448 A | 6/1993 | Morgenthaler et al. |
| 5,280,757 A | 1/1994 | Carter et al. |
| 5,319,176 A | 6/1994 | Alvi et al. |
| 5,363,781 A | 11/1994 | Chang et al. |
| 5,399,833 A | 3/1995 | Camacho |
| 5,451,738 A | 9/1995 | Alvi et al. |
| 5,497,710 A | 3/1996 | Camacho |
| 5,534,659 A | 7/1996 | Springer et al. |
| 5,541,386 A | 7/1996 | Alvi et al. |
| 5,544,597 A | 8/1996 | Camacho |
| 5,606,925 A | 3/1997 | Boen et al. |
| 5,634,414 A | 6/1997 | Camacho |
| 5,657,706 A | 8/1997 | Liagre et al. |
| 5,666,891 A | 9/1997 | Titus et al. |
| 5,675,056 A | 10/1997 | Vance |
| 5,756,957 A | 5/1998 | Titus et al. |
| 5,762,009 A | 6/1998 | Garrison et al. |
| 5,798,497 A | 8/1998 | Titus et al. |
| 5,801,489 A | 9/1998 | Chism et al. |
| 5,809,911 A | 9/1998 | Feizollahi |
| 5,811,752 A | 9/1998 | Titus et al. |
| 5,908,564 A | 6/1999 | Titus et al. |
| 5,943,970 A | 8/1999 | Gonopolsky et al. |
| 5,958,264 A | 9/1999 | Tsantrizos et al. |
| 6,018,471 A | 1/2000 | Titus et al. |
| 6,037,560 A | 3/2000 | Titus et al. |
| 6,089,169 A | 7/2000 | Comiskey |
| 6,153,158 A | 11/2000 | Flannery et al. |
| 6,155,182 A | 12/2000 | Tsangaris et al. |
| 6,173,002 B1 | 1/2001 | Robert |
| 6,182,585 B1 | 2/2001 | Gonopolsky et al. |
| 6,215,678 B1 | 4/2001 | Titus et al. |
| 6,222,153 B1 | 4/2001 | Wald |
| 6,250,236 B1 | 6/2001 | Feizollahi |
| 6,355,904 B1 | 3/2002 | Batdorf et al. |
| 6,380,507 B1 | 4/2002 | Childs |
| 6,388,226 B1 | 5/2002 | Smith et al. |
| 6,514,469 B1 | 2/2003 | Kado et al. |
| 6,551,563 B1 | 4/2003 | Kado et al. |
| 6,576,807 B1 | 6/2003 | Brunelot et al. |
| 6,630,113 B1 | 10/2003 | Surma |
| 6,645,438 B1 | 11/2003 | Dubrovsky |
| 6,763,772 B2 | 7/2004 | Gnedenko et al. |
| 6,781,087 B1 | 8/2004 | Chism et al. |
| 6,817,388 B2 | 11/2004 | Tsangaris et al. |
| 2002/0192030 A1 | 12/2002 | Almeida |
| 2003/0048828 A1 | 3/2003 | Titus |
| 2003/0167983 A1 | 9/2003 | Gnedenko et al. |
| 2004/0159366 A1 | 8/2004 | Tsangaris et al. |

FOREIGN PATENT DOCUMENTS

| | | |
|---|---|---|
| EP | 0 469 737 A2 | 2/1992 |
| WO | WO 01/53434 A | 7/2001 |
| WO | WO 01/79774 A | 10/2001 |
| WO | WO 01/92784 A1 | 12/2001 |
| WO | WO 03/069227 A1 | 8/2003 |

OTHER PUBLICATIONS

International Search Report for PCT Application No. PCT/US2004/031310, Feb. 2005.

Rutberg, "Plasma pyrolysis of toxic waste", Plasma Phys. Control. Fusion, vol. 45, May 6, 2003, pp. 957-969.

Scope of Supply, Terms and Conditions, and Notice to Proceed regarding NCKU PTDR System, Sep. 2002.

Rutberg et al., "The Technology and Execution of Plasmachemical Disinfection of Hazardous Medical Waste", IEEE Transactions On Plasma Science, vol. 30, No. 4, Aug. 2002, pp. 1445-1448.

Rutberg, "Some plasma environmental technologies developed in Russia", Plasma Sources Sci. Technol., vol. 11, Aug. 2002, pp. A159-A165.

Fauchais et al., "Thermal Plasmas", IEEE Transactions On Plasma Science, vol. 25, No. 6, Dec. 1997, pp. 1258-1280.

Municipal Solid Waste Feasibility of Gasification with Plasma ARC, Environmental Analyses, presented to EPRI Symposium Industrial Applications of Plasma, Palo Alto, CA, Mar. 7-9, 1990.

Reference regarding PLASCON™ system.

APPARATUS FOR TREATING LIQUID WASTE

PRIORITY CLAIM

The present application claims priority as a continuation to U.S. application Ser. No. 10/820,651, filed Apr. 8, 2004 now U.S. Pat. No. 6,971,323, which is a continuation of U.S. Provisional Application Ser. No. 60/554,879, filed Mar. 19, 2004. The priority applications are hereby incorporated by reference.

BACKGROUND

This invention relates to the treatment of waste material, and, more particularly, to the controlled thermal destruction of hazardous and non-hazardous materials.

Placing waste material in landfills was previously the accepted method of disposal. When the consequences of landfill disposal were investigated more closely, public opposition and regulatory pressures restricted the landfill practice and compelled the industry to instead employ incineration, the only other then-available technology that was economical and appeared to address the disposal problems.

Incineration proved useful where landfill space was unavailable or too expensive, but, for a number of reasons, it also was generally inadequate. The basic nature of medical waste, for example, creates substantial problems for incinerators. One of the major problems encountered in using incinerators to combust medical waste is the heterogeneity of the waste material. This problem prevents the incinerators from maintaining a sufficiently high constant temperature to completely treat all of the organic and inorganic material in the waste, which can result in hazardous bottom or fly ash. For example, a first bag of such waste may be filled with containers of fluids, blood soaked bandages, and sharp objects (syringes, glass, metal surgical tools, and the like), while a second bag may contain mostly plastics, paper, packing material, pads, surgical gowns, rubber gloves, and the like. These two bags, fed independently into an incinerator, would create totally different combustion conditions. The first bag would quench and cool the combustion process, while the second bag would accelerate and raise temperatures.

During the low temperature cycle, products of incomplete combustion (pollutants) and potentially hazardous organic materials, such as dioxin, furan, and greenhouse gases, may be generated and ultimately released into the atmosphere. During the high temperature cycle, particulate, nitrogen oxide, and metal oxide emissions increase, including hexavalent chromium, a known carcinogen.

Shredding waste before feeding it into the combustion vessel can homogenize and mix the waste, but it may not be acceptable because of the potentially infectious nature of the waste and the inherent problem of disinfecting a shredder having numerous internal components and small confined places where infectious material might collect and escape disinfection. Moreover, some states may have laws prohibiting bags of infectious waste from being opened prior to their final processing.

Compounding the problem of temperature control within incinerators is the batch method of feeding that is commonly used (in contrast to continuous feeding). In this method, a ram system is normally used to push a charge of waste into a combustion vessel. Because the incinerator relies on the waste itself for fuel, as the waste combusts, vessel temperatures vary as the amount of combustible waste in the vessel changes. This problem is especially pronounced at start-up and shut-down. Temperatures also vary with changing feed rates and incinerators can operate poorly at reduced feed rates.

It can be important to achieve and maintain high temperatures because the treatment of inorganic waste components commonly found in medical and other waste streams requires such temperatures. High temperatures are required to melt stainless steel and borosilicate glass used in laboratories, for example, and incinerators may require fossil fuel additions to supplement the combustion process to reach these temperatures.

The destruction of organic waste also requires high temperatures, but instead of melting at high temperatures, such waste decomposes and burns if sufficient air is present. The combustion process can be self-sustaining only if enough heat energy is released during the process to cause additional material to decompose. This can be a problem in incinerators, however, and especially when wet and inorganic materials are present in the feed. Under such conditions, it may not be possible to maintain a high, continuous operating temperature.

Apparatuses that have used plasma torches to improve on the low and varying temperature problem have only achieved a partial solution. For example, a known ram (or batch) feed system causes significant variation in gas flow rates and temperatures, and includes no precautionary measures to hold the exit gas temperature at a safe high level at which reformation of complex organic compounds is minimized. The off-gas piping, for example, is composed of stainless steel and it leads to a steel cyclone for particulate collection, which causes the gas temperature to drop into a sufficiently low range (i.e., into the approximately 350–500° C. range). When the temperature of the gas drops to such temperatures, significant reformation of undesirable organic compounds, and particularly polycyclic aromatic hydrocarbons (PAH's), can occur.

DETAILED DESCRIPTION OF THE PREFERRED EMBODIMENTS

With reference to the figures, a waste processing system 5 is described hereinafter in detail. The waste processing system 5 may be used to treat any type of product that may be decomposed upon the application of energy. For example, it may be used to treat municipal solid waste, medical waste, thermal batteries, fly and bottom ash, and military waste, including weapon components. The waste processing system 5 may also be used to treat other waste such as PCB-contaminated materials, industrial and laboratory sol vents, organic and inorganic chemicals, pesticides, organochlorides, refinery waste, office waste, cafeteria waste, facilities maintenance waste such as wooden pallets, oils, grease, discarded light fixtures, yard waste, wastewater sludge, and pharmaceutical waste. The waste product, furthermore, may include organic and inorganic components and may be in the form of solid and/or liquid material.

For ease of reference, the figures and description sometimes refer to the waste as medical waste, which may include, for example, bags of infectious waste, including blood-soaked sponges, bandages, containers of sharps such as needles, razors, scalpels, and other instruments. It is to be understood, however, that unless stated otherwise or unless it is clear from the context, when reference is made to medical waste or some other particular type of waste product, it also encompasses other types of waste.

Figure 1:
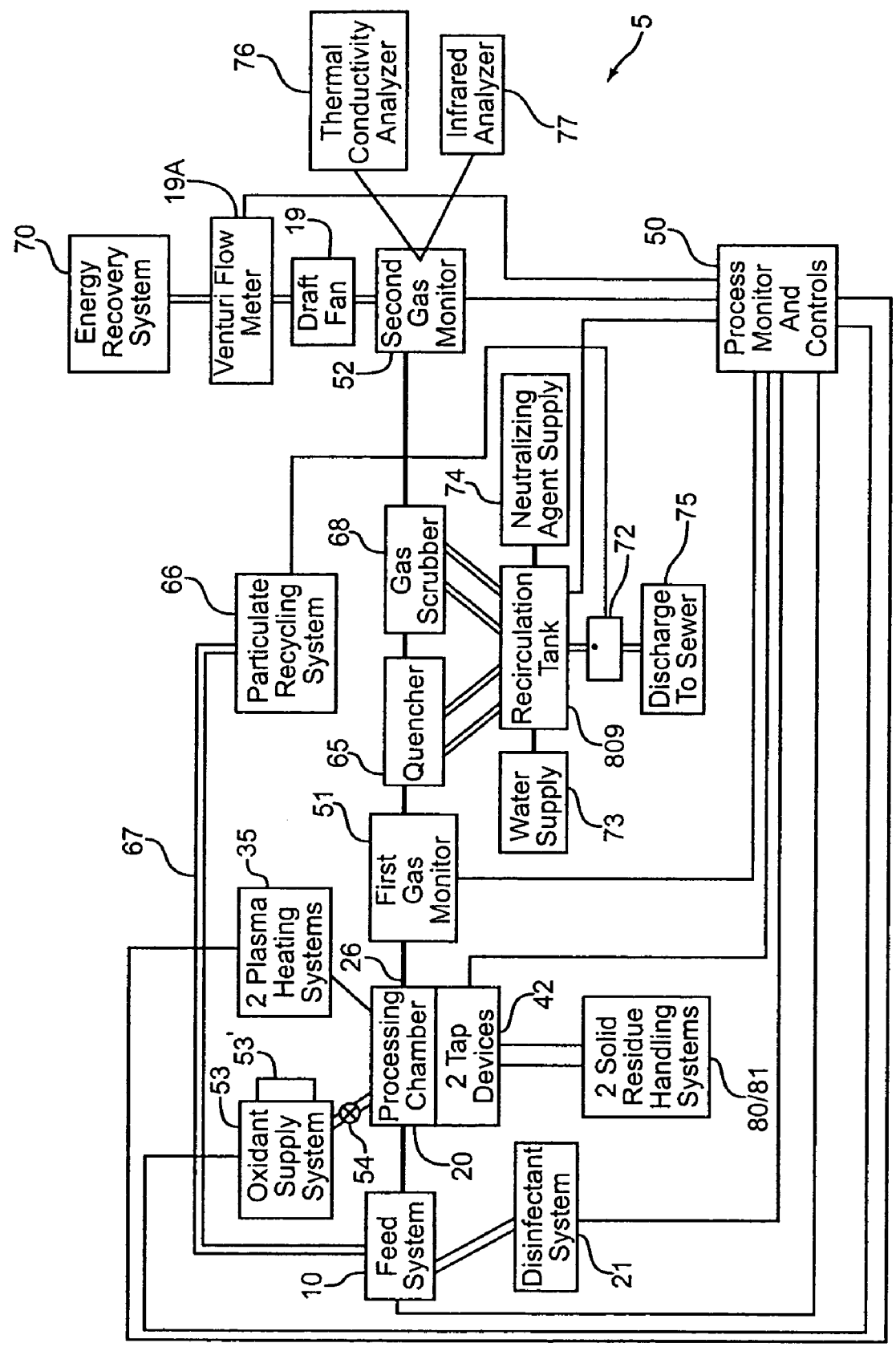
FIG. 1 is a schematic view of an apparatus for treating waste.
Figure 2:
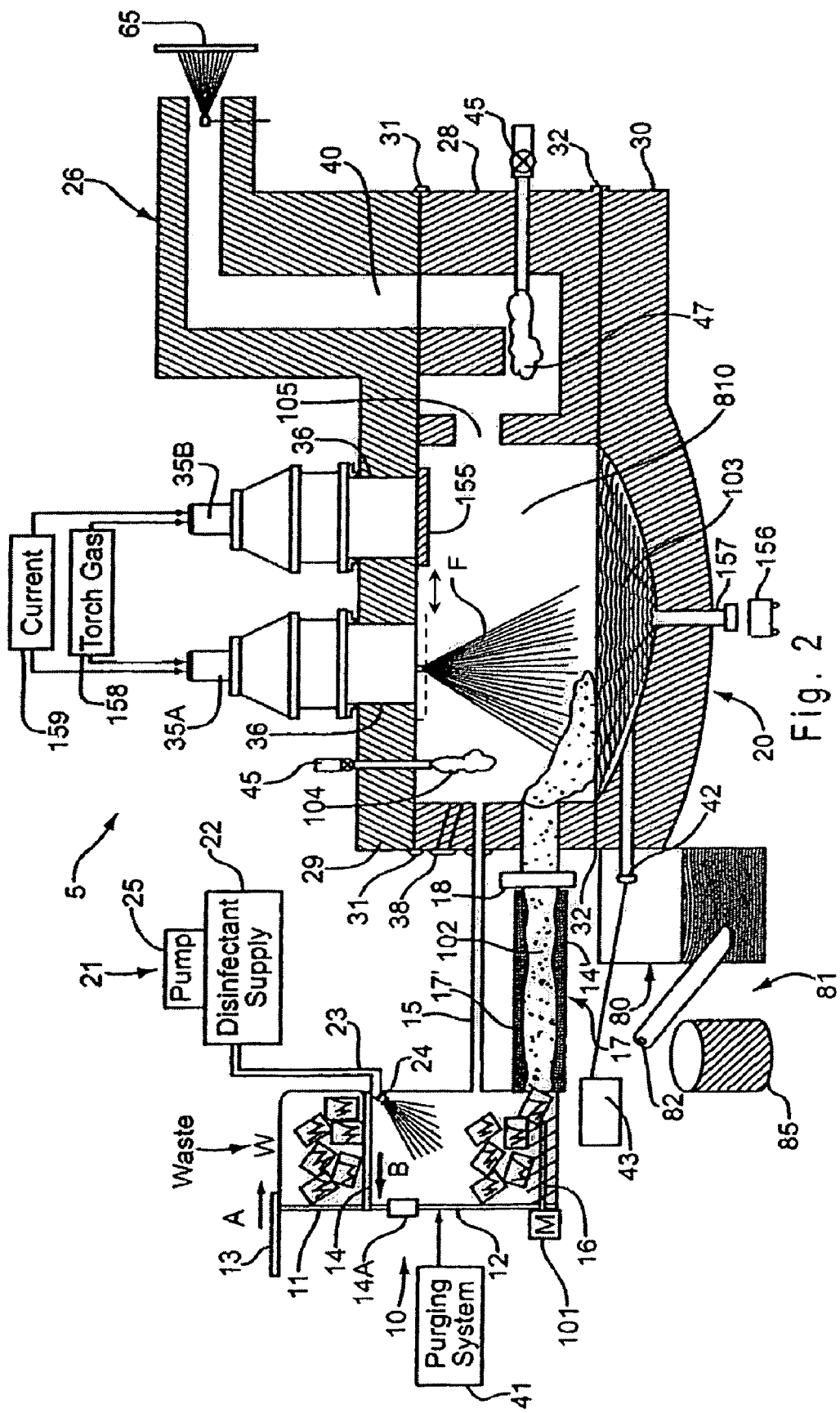
FIG. 2 is a partially schematic view of an apparatus for treating waste.

Referring to FIGS. 1 and 2, the waste processing system 5 includes a waste feed system 10, such as the feed system disclosed in U.S. Pat. No. 5,534,659, which is hereby incorporated by reference herein. The feed system 10 feeds waste "W" into a waste processing or pyrolysis vessel 20. The feed system 10 includes a charging hopper 11 positioned above a feed hopper 12. An airlock door 13 functions as a sliding cover for the charging hopper 11. When waste is to be placed in the charging hopper 11, the door 13 is moved to the opened position as shown. After charging is completed, the door 13 is closed in the direction of arrow "A" to cover the charging hopper 11. A second, alternately opening, sliding airlock door 14 separates the charging hopper 111 from the feed hopper 12 when in its illustrated closed position. To charge the feed hopper 12, the door 14 is opened in the direction of arrow "B" while the door 13 is closed (to prevent the release of any emissions from the feed hopper 12 into the environment and to minimize the introduction of air into the feed hopper 12). Each door 13 and 14 can be provided with appropriate seals that cooperate with seals in the side walls of the charging hopper 11 to prevent emissions from leaking out of the feed system 10.

Inorganic "powdered" type waste streams such as incinerator ash, electric furnace dust or waste water treatment plant sludges, or other types of waste, may be introduced into the feed hopper 12 in an alternative manner. A third sliding airlock door 14A is provided at the side of the feed hopper 12. The door 14A can be operated in a manner similar to the doors 13 and 14. The door 14A, furthermore, can be interlocked such that it cannot be opened when either of the slide doors 13 and 14 is open.

A purging system 41 can be provided to introduce a gas, such as nitrogen, into the feed hopper 12 and/or at other points in the feeding system 10. The purging system 41 can be comprised of a source of nitrogen, such as a nitrogen tank, tubing interconnecting the nitrogen source and the feed hopper 12, and appropriate valving to regulate the quantity of nitrogen introduced into the feed hopper 12 and the timing of the purging. In addition, the purging system 41 can be selectively operated along with the sliding doors 13 and 14. In this manner, the purging system can purge hazardous emissions that may become contained in the feeding system 10 before or while the doors 13 and 14 are opened. The purging system 41 can also limit the amount of combustible gases that were generated in the pyrolysis vessel 20 from escaping from the vessel 20 or the feed hopper 12. The nitrogen gas is vented to the vessel 20 as further described below.

The interior of the feed hopper 12 can be relatively open and free of obstructions and contain minimal crevices or cracks in which infectious material can accumulate. This design can help allow the feed hopper 12 and a cantilevered screw-type auger 16 to be disinfected by a disinfectant system 21. The disinfectant system 21 includes a supply container 22 in which an appropriate disinfectant is retained. For example, a disinfectant comprising a 6% solution of hydrogen peroxide may be used. The container 22 is connected by a supply line 23 to an injector nozzle 24 mounted within the feed hopper 12. The disinfectant is pressurized by a pump 25.

It is desirable that the nozzle 24 is arranged to ensure that the entire area within the feed hopper 12 may be subjected to the disinfectant spray to help prevent or minimize the release of toxic or hazardous emissions when the door 14 to the feed hopper 12 is opened. In an alternative embodiment, several nozzles may be used and each may be positioned to spray disinfectant on a different portion of the feed hopper 12. Also, while it is desirable to spray disinfectant on the entire area within the feed hopper 12, it may be sprayed on less than the entire area. After it is applied, the disinfectant drains into the pyrolysis vessel 20 and is processed as waste.

A vent system 15 can be provided between the feed hopper 12 and the pyrolysis vessel 20. The gas introduced by the purging system 41, e.g. nitrogen gas, and any toxic/hazardous gases can be drawn into the pyrolysis vessel 20 through the vent system 15. The gas can be drawn, for example, as a result of a vacuum created by a draft fan 19 and/or ejector-venturi quencher 65 disposed downstream of the feed system 10 (see FIG. 1).

After the waste is placed into the charging hopper 12, the auger 16 shreds, mixes, compresses, and extrudes the waste charge into a feed tube 17. The auger 16 can be driven by a motor 101, such as a hydraulic motor with a variable speed drive. The feed tube 17 may be surrounded by a water-cooled jacket 17' to help keep the feed tube 17 cool and to help maintain the structural integrity of the feed tube 17, which can be exposed to the elevated temperatures in the vessel 20. The water-cooled jacket 17' may be connected to a water source with a pump. The water can be circulated by the pump in two directions, from the side of the water-cooled jacket 17' closest to the vessel 20 to the opposite side, and from the side of the water-cooled jacket 17' closest to the feed hopper 12 to the opposite side. In the alternative, water can be circulated in both directions. Also, the water may be circulated in two loops, where one loop circulates water to the portion of the Water-cooled jacket 17' closest to the vessel 20, and the other loop circulates water to the portion of the water-cooled jacket 17' closest to the feed hopper 12.

A feed tube slide gate 18 (which also may be water cooled) is provided towards the inlet port of the pyrolysis vessel 20 to isolate part of the feed tube 17 from heat generated in the pyrolysis vessel 20. In the alternative, the slide gate 18 may be located near or at the outlet of the feeding hopper 12 (i.e. at the beginning of the feed tube 17). The opening and closing of the gate 18 may be automatically controlled and can be interlocked such that the gate 18 cannot be opened when either of the slide doors 13 and 14 is open.

In operation, the auger 16 can form the liquid and solid waste together into a dense cylindrical plug 102 in the feed tube 17. The waste can be introduced into the pyrolysis vessel 20 through the feed tube 17 (when the gate 18 is open) at a controlled and desirably continuous rate. Introducing the waste into the vessel 20 in this manner can expose a controlled amount of surface area of the compacted waste to the pyrolysis process and help regulate the formation of gases generated as a result of the pyrolysis. The auger 16 can help minimize the entrainment of air pockets in the waste stream being fed into the vessel 20.

The waste can be introduced directly into a slag pool 103 near the bottom of the vessel 20 or it can be introduced directly into the plasma flame or at other points in the vessel 20. It should be understood, however, that the particular feeding system employed is generally application specific. It should also be understood that any type of known means, or any means subsequently developed, for feeding or transferring the waste to the vessel 20 may be employed with the waste processing system 5 described herein.

Organic and inorganic waste may be treated separately or simultaneously with the waste treatment system 5 described herein. To process the waste separately, the inorganic and organic waste streams are separately introduced into the feeding system 10 and fed into the vessel 20. To process the waste streams simultaneously, the waste streams are simultaneously introduced into the feeding system 10 where the waste is shredded and mixed to create a homogenous mix, which is then fed into the vessel 20. Equal or non-equal portions of organic and inorganic waste can be treated with the waste processing system 5 described herein.

The desired rate at which the waste is fed into the vessel 20 is dependent, for example, on the characteristics of the waste, the plasma energy available from the plasma generating system and the temperature and oxygen conditions within the pyrolysis vessel 20. The feed rate may be initially calculated based on an estimation of the energy required to process the specific waste type being treated. The desired feed rate is determined by actual operation of the system, and is selected to maintain a desired average temperature within the pyrolysis vessel 20. AC plasma torches 35A and 35B, described in greater detail below, can generate a flame "F", which inputs energy into the pyrolysis vessel 20 that is absorbed by the waste during the pyrolysis process. An excessive feed rate maintained for a period of time can cause the interior temperature of the pyrolysis vessel 20 to decrease or increase depending on the waste being treated. An inappropriate feed rate can cause the pyrolysis vessel 20 to overheat or pressurize. Accordingly, the desired feed rate is selected to achieve the desired average temperature, which can be in the range of about 1,370° C. to 1,850° C. An example of a waste processing system is one that is capable of processing approximately 1000 pounds of waste per hour, using a 500 kW AC plasma torch. A system including an AC torch of about one-half of this power rating and a proportionally smaller processing vessel processes about 500 pounds per hour.

The vessel 20 is a plasma arc furnace and can be designed to withstand temperatures of up to about 1,850° C. in a reducing atmosphere. For example, the vessel 20 can be made of carbon steel, stainless steel, and/or other materials, such as hastelloy. The vessel 20 includes a main section 28, which can be squarely or cylindrically shaped or shaped in some other manner. The vessel 20 also includes a flat roof section 29 and a lower section 30, which includes a bowl-shaped portion. The sections are assembled at flanged joints 31 and 32 so as to provide an airtight structure. The upper structure surrounding the open space 810 is lined with alumina refractory. The bowl-shaped portion of the lower section 30 is lined with chrome-containing alumina refractory, which can inhibit the erosion caused by the slag and molten metal contained in the slag pool 103 (further described herein).

The vessel 20 is generally a horizontally oriented structure, which has several advantages over other structures. For example, it can reduce the distance between the AC torches 35A and 35B and the bowl-shaped lower portion, which can facilitate melting and tapping as further described below. In addition, the torches 35A and 35B can therefore be mounted without penetrating the open space 810 of the vessel 20.

The vessel 20 can be optimally shaped based on the characteristics of the waste to be treated. For example, if the waste will include a percentage of inorganic material, it can be shaped with a bowl-shaped lower portion. As further described below, as the inorganic material is fed into the chamber, it is melted or vitrified and can form a slag pool 103 contained by gravity in the bowl-shaped lower portion. Accordingly, the volume of the bowl-shaped lower portion can be sufficiently large to contain the slag pool 103 in operation.

If the waste will include a percentage of organic material, for example, the vessel 20 can be shaped with an open area 810. As further described below, as the organic material is fed into the vessel 20, it is dissociated into its elemental components and gasified within the vessel 20. The open area 810 can be sufficiently large to allow the organic waste to gasify and circulate around the vessel 20 (absorbing the energy from the flame "F") and dissociate into its elemental components before exiting the vessel 20.

If the waste will include a percentage of organic material and a percentage of inorganic material, it can be shaped with a bowl-shaped lower portion and an open area 810. An exemplary vessel processing 5 tons of organic and/or inorganic waste per day has a total volume of about 50 cubic feet, has a bowl-shaped volume of about 8 cubic feet, and its overall dimensions are about 62 inches high, and 97 inches square. The optimal dimensions of the vessel 20, however, are application dependent.

The AC plasma torches 35A and 35B can be mounted through the torch receptacle openings 36 of the vessel 20. While two torches are illustrated, one or more torches can be used. An exemplary AC plasma torch is manufactured by The Institute for Problems of Electrophysics—Russian Academy of Sciences (IPE-RAS), located in St. Petersburg, Russia. Desirably, the torches 35A and 35B are mounted so that the bodies of the torches do not penetrate the interior of the vessel 20. By mounting the torches in this fashion, torch-cooling loads may be decreased thus increasing operating thermal efficiency and lowering cost. Moreover, in the event of a water line break inside the torches 35A and 35B, the water will not flow into the vessel 20. In other embodiments, however, the body of the torches 35A and 35B partially or fully penetrate the vessel 20.

Either torch, 35A or 35B, or both, may be activated during operation of the waste processing system 5. The other torch can be provided to reduce or eliminate system down time while replacement of torch electrodes is performed on the first torch. When one torch is being replaced or fixed, the other can be used. The non-operating torch can be isolated from the vessel 20 by means of a slide gate 155. This can help facilitate maintenance of the torch and electrode replacement without significant impact on the operating schedule.

In other embodiments, however, only one torch may be provided and used, or more than two torches may be provided and used. In addition, the two or more torches can be operated simultaneously or in an alternating or intermittent manner as long as power supplies are provided for each activated torch.

The torches 35A or 35B (the torch 35A is shown in operation in the embodiment shown in FIG. 2) emit a plasma flame "F" with temperatures exceeding about 6,000° C. The flame "F" provides energy, which heats the interior of the vessel 20 to a uniform temperature desirably in the range of about 1,370° C. to about 1,850° C. A non-transferred type torch can be used for treating medical waste that can be high in organics. In comparison to transferred type torches, non-transferred type torches can offer the advantages of simpler mechanical control requirements as continual torch motion is not required, greater bulk gas heating capability, increased arc stability, especially during the heat up period, simplified furnace design, and overall greater system reliability. The arc in non-transferred type torches, furthermore, does not become "short-circuited" when waste is introduced into the system. The plasma heating system 35 further includes a power supply, supporting utilities such as a plasma gas compressor, and a cooling system.

The waste processing system 5 can employ an AC plasma torch. An AC torch has an inherently stable plasma plume that is more diffuse and dense compared to a DC torch. The wide plume enhances the ability of the torch to achieve molecular dissociation of the hazardous components in the waste being treated, as further described herein. In addition, an AC torch typically can have lower operating costs than a DC torch. The electrodes used in AC torches cost less than the electrodes used in DC torches. AC torches, furthermore, have an inherently higher electric to thermal efficiency. When the flame is varied on a DC plasma torch, furthermore, the life of the torch electrodes can decrease significantly (because DC torch electrodes are designed with a fixed torch gas pressure). On the other hand, when the flame is varied on an AC plasma torch, such as by varying the current as further discussed herein, the life of the torch electrodes is not significantly affected.

DC torches are typically positioned relative to a plasma arc furnace such that the body of the torch penetrates the furnace. This exposes the torch body to the high temperatures generated in the furnace and, in turn, requires that a coolant (e.g., water) be continuously circulated through the torch body. As a result, heat energy generated in the furnace can be lost to the torch and torch body. AC torches, on the other hand, can be mounted relative to the furnace such that the torch body does not penetrate the furnace. Accordingly, AC torches can require less circulating coolant and can allow for a greater amount of the energy generated in the furnace to be productively used.

When the electrodes of a DC torch need to be replaced, the entire torch must be removed from the system and a torch sealing device may be temporarily installed to fill the void where the torch is removed. An AC torch, in contrast, does not need to be removed from the system when the electrodes need replacement. The electrodes of an AC torch can be replaced in situ. Despite some of the advantages of using an AC torch, however, one or several DC torches may be used with the waste processing system 5 described herein, alone or together with an AC torch.

The waste processing system 5 can allow the plume length of the flames and power generated by the torches 35A and 35B to be varied depending on the type of waste being treated (by controlling the type of torch gas 158, the flow rate of the torch gas 158, and torch current 159). For example, the torch power output can be regulated by the process monitor and controls 50 such that four current settings are provided to an operator to adjust the flames. The settings can vary, for example, by a factor of 5. Any number of settings, however, may be provided, and the settings can vary by factors other than 5.

When processing organic materials, for example, the flame can be variable and can be adjusted to be wider and shorter. In this manner, the flame can cover a larger area within the vessel 20. The flame thus contacts a greater portion of the gases circulating in the vessel 20, which can increase the efficiency of the destruction of organic materials. In addition, the flame can contact a greater surface area of the slag pool, which can facilitate the melting of inorganic materials.

The desirable flame size and shape is implementation dependent and can depend, for example, on the waste being treated and the shape and dimensions of the vessel. An exemplary flame shape is roughly oval and approximately 6 inches in diameter by 2 feet long. An access and viewing port 38 is provided in the central section of the pyrolysis vessel 20. An operator can monitor the flame through the port 38.

In operation, as the waste material is introduced into the vessel 20, it absorbs energy by convection, conduction, and/or radiation from the plasma flame "F", the heated refractory lining, and the heated gases circulating in the vessel 20. Generally speaking, the energy melts or vitrifies the inorganic portion of the waste (such as non-toxic metals, toxic heavy metals, ceramics, glasses, soil, and ash) and gasifies and dissociates the organic portion of the waste. Thus, the energy from the torches 35A and 35B can be used for the purpose of melting or vitrifying inorganic waste and gasifying and dissociating organic waste, simultaneously or non-simultaneously.

Turning first to the inorganic portion of the waste material, as it is melted, it forms the slag pool 103 of glass-like slag and, in some instances, a metal layer, which may be separable. To remove the glassy slags from the pyrolysis vessel 20, the slag pool 103 may be drained through slag taps 42 and 46 (not shown) which can be positioned at the sides of the vessel 20. The taps 42 and 46 can be of a suitable diameter to allow tapping of the glassy slag at a greater rate than accumulation of the glassy slag. The taps 42 and 46 can operate at the same time or at alternate times. Desirably, however, the taps 42 and 46 are operated simultaneously when a significant percentage of inorganic waste material is being processed because the time necessary to drain the slag pool 103 can be decreased compared to when only one tap is operated. The taps 42 and 46 can be selectively used, rather than continuously used, in order to minimize energy loss from the pyrolysis vessel 20 during tapping. Accordingly, the taps 42 and 46 can be sealed during standby periods by a tap positioning device ("tap plug") 43 which closes the taps 42 and 46.

In other embodiments, only one tap may be provided and used or more than two taps may be provided and used. In addition, the taps can be positioned at locations of the vessel 20 other than at the sides. For example, a tap 157 can be located toward the bottom of the vessel 20. Furthermore, other means may be used to drain the slag pool 103 from the vessel 20.

When a significant percentage of inorganic waste is being processed, nitrogen can be used as the torch gas, which can reduce or eliminate the formation of oxides in the slag pool 103. This can help facilitate the draining of the slag pool 103 because the metals remain in elemental form (rather than forming metal oxides).

When spent refinery catalysts are being processed, for example, several additives may be used to help treat the waste. Such catalysts generally have a relatively high Alumina (i.e. $Al_2O_3$) content. Because of the high Alumina content, the refractory lining the vessel 20 may be eroded or degraded during the treatment of such catalysts. This degradation can be avoided or minimized if the catalyst waste is treated in a reducing atmosphere such that the Alumina content is reduced. Accordingly, reducing agents, such as waste oils, petroleum coke, medical waste, or other organic hazardous wastes or material containing high levels of carbon, can be added to the waste stream during the treatment of spent refinery catalysts. The reducing agents can also help maintain the fluidity of the slag pool 103 and facilitate tapping.

The fluidity of the slag pool is generally dependent on the composition of the slag pool 103. The composition of the slag pool 103 generated as a result of treatment of the spent catalyst waste can be controlled by the addition of a fluxing agent that contains calcium and/or silica to the catalyst waste stream. Exemplary fluxing agents include incinerator fly ash, spent materials from the waste water treatment system, and $CaF_2$ sludges generated, for example, by the semiconductor industry. If $CaF_2$ sludge is used as the fluxing agent, however, the amount added to the catalyst waste stream can be controlled to minimize the generation of HF gas.

The glassy slag drained through the taps 42 and 46 can be drained into two separate solid residue handling systems 80 and 81. For simplicity, only solid residue handling system 81 is illustrated in FIG. 2. The slag can be drained into a sealed water tank 80 (with continuously regenerated water). The solid residue handling system 81 can also include a conveyor or other suitable device 82 and a bin 85 for transport and disposal.

In operation, the molten material (glassy slag) passes through the taps 42 and 46 and into the slag removal system, such as the sealed water tank 80 and associated components, where the material can be rapidly quenched (and solidified), which causes it to fracture into smaller pieces. The solid glassy slag can be essentially inert because the heavy metals are bound within it. Consequently, the glassy slag can resist leaching in the solid state. The solid glassy slag may then be transported from the sealed water tank 80 to the disposal bin 85 by the conveyor 82.

The glassy slag may also be drained through the taps 42 and 46 into water-cooled slag tap carts, such as cart 156, which are removed from the vessel after the slag is cooled and solidified. As a further alternative, the slag can be drained into other specially designed components contained in the cars, such as molds insulated by sand.

The solid glassy slag, which is benign and does not require landfilling, may then be used for a number of commercial applications, including road construction, concrete aggregate, blast cleaning, and fiberglass. It can also be formed into decorative tiles, or used in conjunction with building materials to create lightweight pre-engineered home construction materials.

Over a period of time, a layer of metals may accumulate at the bottom of the slag pool 103. Certain metals such as iron do not react readily with the silicates contained in the slag pool 103. The glassy material absorbs some of these metals, but the metals may accumulate if a large amount is present in the waste stream. The metals can be drained through the taps 42 and 46 and processed as described above.

Turning now to the organic portion of the waste material, as it is heated, it can become increasingly unstable until it eventually dissociates into its elemental components, mainly solid carbon (fine carbon particulate) and hydrogen gas and is gasified. Oxygen, nitrogen, and the halogens (typically chlorine) are also liberated if present in the waste in a hydrocarbon derivative. This gasification and dissociation process is generally called molecular dissociation pyrolysis. Pyrolysis is a process by which intense heat operating in an anaerobic or extremely low oxygen environment dissociates molecules, as contrasted with incineration or "burning."

The time required to achieve dissociation can vary slightly for different materials, but is typically well under a second and often milliseconds for most compounds at 1100° C. Thus, hazardous waste, which is generally made up of complex organic compounds including hydrogen, oxygen, nitrogen and carbon atoms, can be disassociated into its elemental constituents. This dissociation can destroy the hazardous or toxic constituency of the waste material.

Upon dissociation, oxygen and chlorine can be free to react with the carbon and hydrogen produced and could theoretically reform a wide array of complex (and potentially hazardous) organic compounds. Such compounds, however, generally cannot form at the high temperatures maintained within the vessel 20 at which only a limited number of simple compounds may be stable. The most common and stable of these simple compounds are carbon monoxide (formed from a reaction between the free oxygen and carbon particulate), diatomic nitrogen, hydrogen gas, and hydrogen chloride gas (when chlorine is present).

There is normally an insufficient amount of oxygen liberated from the waste material to convert all of the fine particulate carbon to carbon monoxide gas. While moisture in the waste may liberate additional oxygen, unless the waste moisture content is uniformly distributed throughout the waste and exceeds at least about 30% by weight, the conversion of the solid carbon to carbon monoxide gas may not be maximized. As a result, fine carbon particulate can be entrained and carried out of the flame "F" by the hydrogen-dominated gas stream.

To maximize the conversion of solid carbon to carbon monoxide gas, an additional source of oxygen may be used. Accordingly, the waste processing system 5 described herein includes a means for injecting an oxidant into the system in an amount effective to convert a portion of the carbon particulate to carbon monoxide. The injection means can be an oxidant supply system 53 which includes a steam generator 53' and a steam valve 54 that is opened in a controlled manner (as further described below) to supply steam to injectors 45. The injectors 45, in turn, inject predetermined amounts of steam into the pyrolysis vessel 20 and gas vent 40. In other embodiments, different oxidants such as air or oxygen gas may be used as the oxidant. In addition, other means may be employed to introduce the oxidant into the vessel 20. For example, the oxidant may be introduced through the torches 35A and 35B or may be mixed with the waste in the feed tube 17.

The steam injected into the system can convert the free carbon into primarily carbon monoxide. Because pure carbon is more reactive at the high operating temperatures than the carbon monoxide gas, additional oxygen injected into the vessel 20 should react with the carbon and form carbon monoxide, and not with the carbon monoxide to form carbon dioxide (assuming that the oxidant is not added in excess). Carbon dioxide is also relatively less stable at the high pyrolysis temperatures than carbon monoxide.

After the oxidant is injected into the system through injectors 45, turbulence can be created to thoroughly mix the carbon and steam to facilitate gasification of the carbon. The vessel 20 includes a turbulent region 104 and the gas vent 40 includes a turbulent region 47 into which the oxidant can be injected and through which the exiting gas and entrained carbon can be forced to pass. The carbon and oxidant desirably can remain in the turbulent region for an amount of time sufficient to maximize the oxidation reaction.

The residence time is the amount of time that the gas and entrained particulate and steam remain in the high temperature region of the vessel 20 and the off-gas piping (i.e. the gas vent 40 and piping 26). Residence time can be a function of the system volume and geometry, gas flow rate, and the distance the gas travels. At the highest gas flow rate, the volume of the vessel 20, turbulent regions 104 and 47 and the off-gas piping that carries the gas to the ejector-venturi quencher 65 should provide a sufficient residence time for the complete dissociation of the organic materials and the oxidation reaction to occur. The turbulent regions 104 and 47 can improve the probability of reaction between carbon and oxygen without having to increase the residence time or the volume of the vessel 20 or off-gas piping.

The amount of oxidant added through the injectors 45 can be closely controlled, because excess oxygen in the system may cause combustion to occur, which can lead to the formation of carbon dioxide (which has no fuel value). In addition, excess oxygen can undesirably lead to the formation of compounds such as polyaromatic hydrocarbons, dioxins, and furans.

The proper amount of oxidant injected through the injectors 45 can be determined through two alternative means. Generally, the amount of oxidant needed to achieve the desired gasification of the particulate carbon can be determined by monitoring the percentages of carbon monoxide, carbon dioxide, and methane in the product gas stream. This can be accomplished by a second gas monitor 52 (further described below). As the waste composition in the feed varies, however, temporary, rapid changes can occur in the amount of carbon particulate entrained in the gas leaving the pyrolysis vessel 20. Accordingly, an immediate adjustment in the amount of oxidant injected through the injectors 45 is sometimes required to respond to such surges. In this situation, the proper amount of oxidant injected through the injectors 45 can be determined downstream with a particulate monitoring system.

Figure 3:
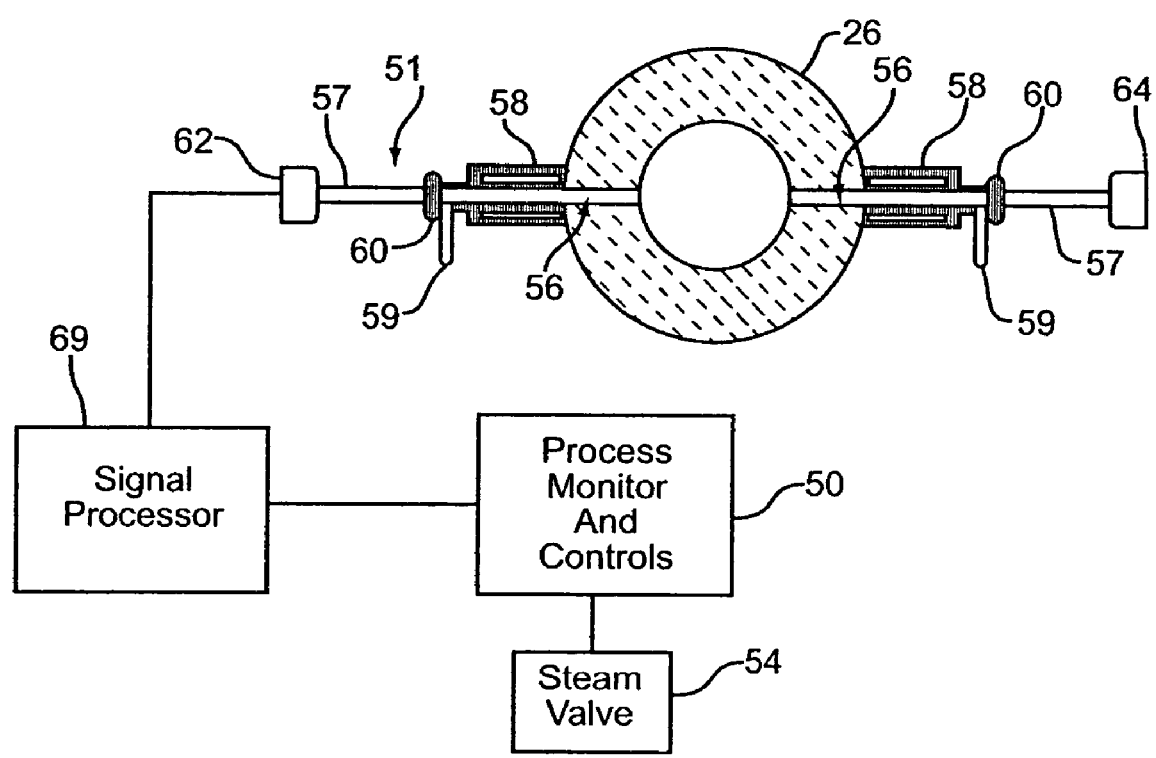
FIG. 3 is a partially schematic view of a particulate monitoring system.

FIG. 3 illustrates an exemplary particulate monitoring system of the waste processing system 5, a first gas monitor 51. The first gas monitor 51 can measure the amount of free carbon in the gas stream as it exits the pyrolysis vessel 20. The first gas monitor 51 can include a tap having small viewing holes 56 in the refractory lining of the outlet gas piping 26 from the vessel 20. The viewing holes 56 can be fitted with stainless steel pipes 57, water-cooled jackets 58 surrounding the pipes, nitrogen purge ports 59, glass pressure windows 60, a light source 64 and a detector 62.

The detector 62 can continuously monitor the gas leaving the pyrolysis vessel 20 to measure carbon particulate. Light of a specified wavelength from the light source 64 travels across the gas pipe 26 to the detector 62. The amount of light that reaches the detector 62 can be dependent on the density of the carbon particulate in the gas traveling through the pipe 26. The carbon particulate causes scattering and dispersion of the light emitted from the light source 64.

The output from the detector 62 goes to a signal processor 63 connected to the process monitor and controls 50. The process monitor and controls 50 (see also FIG. 1) desirably includes a programmable logic controller having an imbedded microprocessor, and various controls and monitoring devices, which can control the amount of steam injected through the injectors 45.

In operation, the detector 62 can identify surges of carbon particulate in the gas stream that can follow the rapid decomposition of organic material and sends a corresponding signal to the signal processor 63, which processes the signal and directs it to the logic devices of the process monitor and controls 50. The logic devices control the opening of the steam valve 54 to cause oxidant to be immediately injected through the injectors 45 until an acceptable carbon particulate level has been restored. The waste processing system 5 thus achieves a balance between the amount of liberated carbon and the amount of oxygen permitted to react with it. An exemplary acceptable carbon particulate level is about 30 grains/scf.

Referring to FIG. 2, the gas (i.e. mostly hydrogen gas, carbon monoxide gas, and/or hydrogen chloride gas) formed from the dissociation and partial oxidation of the organic portion of the waste can be heated to at least about 900° C. to 1150° C. in the vessel 20. This gas, called a synthesis gas, can be drawn out of the vessel 20 through the outlet 105 by the vacuum created by the downstream draft fan 19 (shown in FIG. 1). After exiting the vessel 20, the synthesis gas travels through the gas vent 40 and then through the piping 26. The gas vent 40 and piping 26 can be designed to convey the synthesis gas at a temperature of between about 875° C. and 1350° C. to the ejector-venturi quencher 65. For example, the gas vent 40 and gas pipe 26 may be refractory lined and thermally insulated. In addition, the gas vent 40 and gas pipe 26 can be designed to be airtight to prevent the introduction of unwanted air into the synthesis gas stream.

The gas is then rapidly cooled in the quencher 65 to a temperature of less than about 150° C. The quencher 65 may be constructed of carbon steel or a specialty metal, such as Hastelloy or other appropriate materials, which can inhibit corrosion that may be caused by any acidic gases present in the synthesis gas. The quencher 65 may be lined with refractory materials.

A spray nozzle is mounted at or near the top of the quencher 65 and sprays a scrubbing solution (such as water) down through the quencher 65. The scrubbing solution is desirably introduced into the quencher 65 at a rate of about 750 to 1,300 liters/minute. At this rate, a pressure (draft) can be created through the system, which can induce the flow of gases away from the torches 35A and 35B and through the quencher 65. In addition, the feed rate creates a backpressure against the spray nozzle, which can help atomize the scrubbing solution into fine droplets. Fine droplets are desirable, because they provide increased surface area.

As the hot synthesis gas contacts the droplets, the scrubbing solution is quickly heated and evaporative cooling quickly lowers the synthesis gas temperature to prevent or minimize the reformation of undesirable complex organic molecules. The atomized scrubbing solution can also remove inorganic particulates, heavy metals, and carbon particulates entrained in the synthesis gas. These materials can be carried by the scrubbing solution by gravity into a scrubber recirculation tank 809 (while the gas continues on through the waste treatment system 5).

The quencher 65 can provide several benefits. For example, the quencher 65 can provide high turn-down ratios, which allows the system to operate effectively at the low gas flows generated when processing inorganic materials and the high gas flows generated when processing highly organic materials. It can also provide a high particulate removal efficiency and inherent stability in terms of the gas temperature fluctuations caused when processing combinations of waste streams, such as medical waste, with a highly variant composition.

The quencher 65 can be located close to the vessel 20 to minimize heat loss and cooling until the gas reaches the quencher 65 and is rapidly cooled. High temperature thermocouples, for example, can monitor the gas temperature exiting the vessel 20 and downstream proximate to the inlet of the quencher 65 to confirm that the synthesis gas reaches the quencher 65 at an appropriate temperature.

It is desirable to maintain the temperature of the synthesis gas above about 1,000° C. before it is rapidly cooled in the quencher 65 to minimize or prevent the formation of hazardous or toxic substances such as furans or dioxins. Various operating parameters can be used to maintain the synthesis gas temperature within the preferred operating range. The operating gas temperature inside the vessel 20, for example, is at least partially a function of balancing the torch power input and the waste material feed rate. The torches 35A and 35B provide the principal requisite amount of heat to ensure the molecular dissociation and to maintain a minimum bulk vessel temperature, which may be determinative of the gas temperature. The waste absorbs heat energy as it is fed into the vessel. Because the torch power can be primarily fixed by its size and operating parameters, the waste feed rate and additives (e.g., combination of organic/inorganic wastes) can be used to prevent the vessel 20 from overheating or under heating, and thereby to regulate the vessel/gas temperature.

Another parameter that can influence gas temperature is the amount of combustion/oxidation that occurs to form carbon dioxide. For example, injecting additional excess steam into the vessel 20 may allow a larger percentage of carbon to oxidize to carbon dioxide (and carbon monoxide to oxidize to carbon dioxide). This reaction is exothermic, and it releases additional heat, which tends to raise temperature. This reaction can be promoted to raise temperatures at the beginning of the waste treatment process; however, it can lower the fuel quality of the end-product gas and, accordingly, it is a less desirable aspect of the process if the end-product gas is intended for productive use.

After the gas is cooled by the quencher 65, it is drawn by the draft fan 19 into a means for neutralizing gaseous pollutants in the synthesis gas, such as acidic gases, and for separating any remaining inorganic particulates, heavy metals, or carbon particulates entrained in the synthesis gas. This means can be a scrubber 68, such as a conventional packed bed scrubber. The scrubber 68 can be comprised of a flow-through vessel containing spray nozzles located at the top of the vessel and a random or high performance packing that provides a close gas-liquid contact. Water or water mixed with a neutralizing agent from the neutralizing agent supply 74 (e.g., sodium hydroxide) can be flowed from the nozzles downward by gravity over the packing as the gases are flowed upward through the packing. Hydrogen chloride gas, for example, which was formed in the vessel 20, can be neutralized in the scrubber 68 by reacting it with a basic neutralizing agent to form salts while the gas travels through the scrubber 68. The blowdown from the scrubber 68 can collect in the recirculation tank 809 along with the blowdown from the quencher 65.

Most of the blowdown from the quencher 65 and scrubber 68 that collects in the tank 809 can be recirculated to the quencher 65 and scrubber 68. A portion of the blowdown, however, can be flowed (by gravity or pump) to a wastewater treatment system 72. A water supply 73 and a neutralizing agent supply 74 supply regulated amounts of water and a neutralizing agent (e.g., sodium hydroxide) to the recirculation tank 809 to make up for the blowdown flowed to the wastewater treatment system 72.

In the wastewater treatment system 72, the particulate matter can be concentrated, for example, by allowing the particulate to settle and/or adding a floculant that causes the particulate to agglomerate and form larger particles. The particulate can then be transferred to a particulate recycling system 66 and/or discharged to a sewer 75. In the particulate recycling system 66, a filter press can be used to remove the water (or scrubbing solution) from the particulate and form a particulate cake. The cake may be introduced back into the feeding system 10 to be reprocessed or it can be combined with another waste stream to be processed.

After the synthesis gas leaves the scrubber 68, it can pass the second gas monitor 52, which comprises an on-line gas monitor for monitoring the composition of the synthesis gas. The gas monitor 52 can include a thermal conductivity analyzer 76 to measure the percentage of hydrogen, and at least one infrared analyzer 77 to measure the percentages of carbon monoxide, carbon dioxide, and methane. These measurements can be representative of the total hydrocarbons in the synthesis gas. The analyzers 76 and 77 provide a general measure of the proportions of carbon and oxygen in the gas and this measure can be used for monitoring overall process balance and for generally determining the proper amount of oxidant to be injected through injectors 45, as discussed above. Generally speaking, the higher the amount of unreacted carbon particulate detected in the synthesis gas, the higher the amount of oxidant that should be injected through the injectors 45.

In addition, the second gas monitor 52 can be used to determine if there are any air leaks in the system. Such leaks can be indicated by low total percentages of hydrogen, carbon monoxide, carbon dioxide and methane. If air, being about 80% nitrogen, is leaking into the system, the total percentage of the four gases can be less than approximately 92–94%. The gas percentages can also indicate that the system is operating properly.

After the synthesis gas passes the second gas monitor 52, it can be drawn through the draft fan 19 and then monitored by a venturi flow meter 19A, which measures the gas differential pressure. In the alternative, the meter 19A may be located before or together with the fan 19. The measurements from the meter 19A may be sent to the process monitor and controls 50, which can calculate the volumetric gas flow rate. This rate can be used to help set the overall control settings for processing waste materials. For example, the rate can indicate whether the system is operating in a manner that exceeds its capacity. If the system is operated above capacity, the waste materials may not be completely treated or destroyed, which can lead to undesirable pollutant emissions. Exemplary flow rates are about 4,000 to about 20,000 STD cubic feet per hour for a system processing 5 tpd of materials.

Generally speaking, the process monitor and controls 50 can monitor process variables that can be subsequently used to control other process variables to achieve the desired end product of the waste treatment process. The waste processing system 5, for example, can be designed to control the reformation of the organic compounds from the dissociated elemental components. This can be achieved, for example, by controlling various process temperatures and pressures and also the injection of an oxidant into the system. Desirably, the waste processing system 5 maximizes the percentages of hydrogen and carbon monoxide, and minimizes the percentages of carbon dioxide, carbon particulate, and reformed complex organic compounds in the synthesis gas.

The synthesis gas exiting the meter 19A may then be transported to a known conventional energy recovery system 70 (i.e. a system that utilizes the energy of the synthesis gas). The resulting clean fuel gas can be mostly hydrogen and carbon monoxide and, more particularly, can be roughly about 45–55% hydrogen gas and about 30–40% carbon monoxide gas. The gas can be used as a fuel for steam or electricity generating equipment or the hydrogen can be extracted as a clean fuel or precursor in many important manufacturing processes (e.g., plastics and methanol production). In addition, as an alternative to natural gas for electricity production, the resulting clean fuel gas produced as described herein has the ability to help preserve valuable fossil fuels.

FIGS. 4–7 represent flow diagrams of exemplary methods for treating waste, such as with the above-described waste treatment system 5. It should be understood, however, that the method steps illustrated by the blocks in these figures may be performed in other sequences, other steps may be added, and/or one or some of the steps may be skipped, deleted, or performed simultaneously with another step or other steps. In addition, the method steps may be carried out in a waste treatment system other than the systems described herein.

Figure 4:
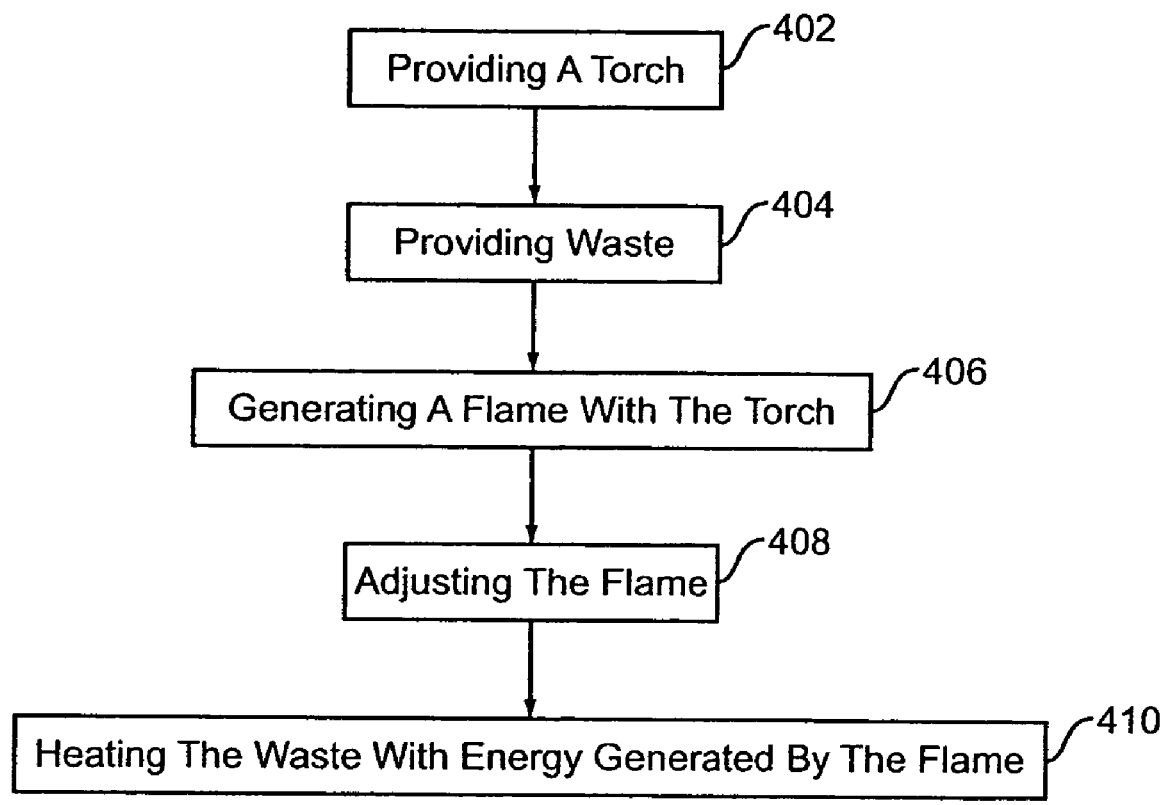
FIG. 4 is a flow diagram of a method for treating waste.

FIG. 4 is a block diagram showing an exemplary way of treating waste, such as with the waste treatment system 5. At block 402, a torch is provided. The torch can be a plasma torch, and, specifically, an AC plasma torch. At block 404, waste is provided. At block 406, a flame is generated with the torch. The flame may be generated, for example, with nitrogen as the torch gas. At block 408, the flame is adjusted. The flame can be adjusted, for example, depending on the characteristics of the waste to be treated. At block 410, the waste is heated with energy from the flame.

Figure 5:
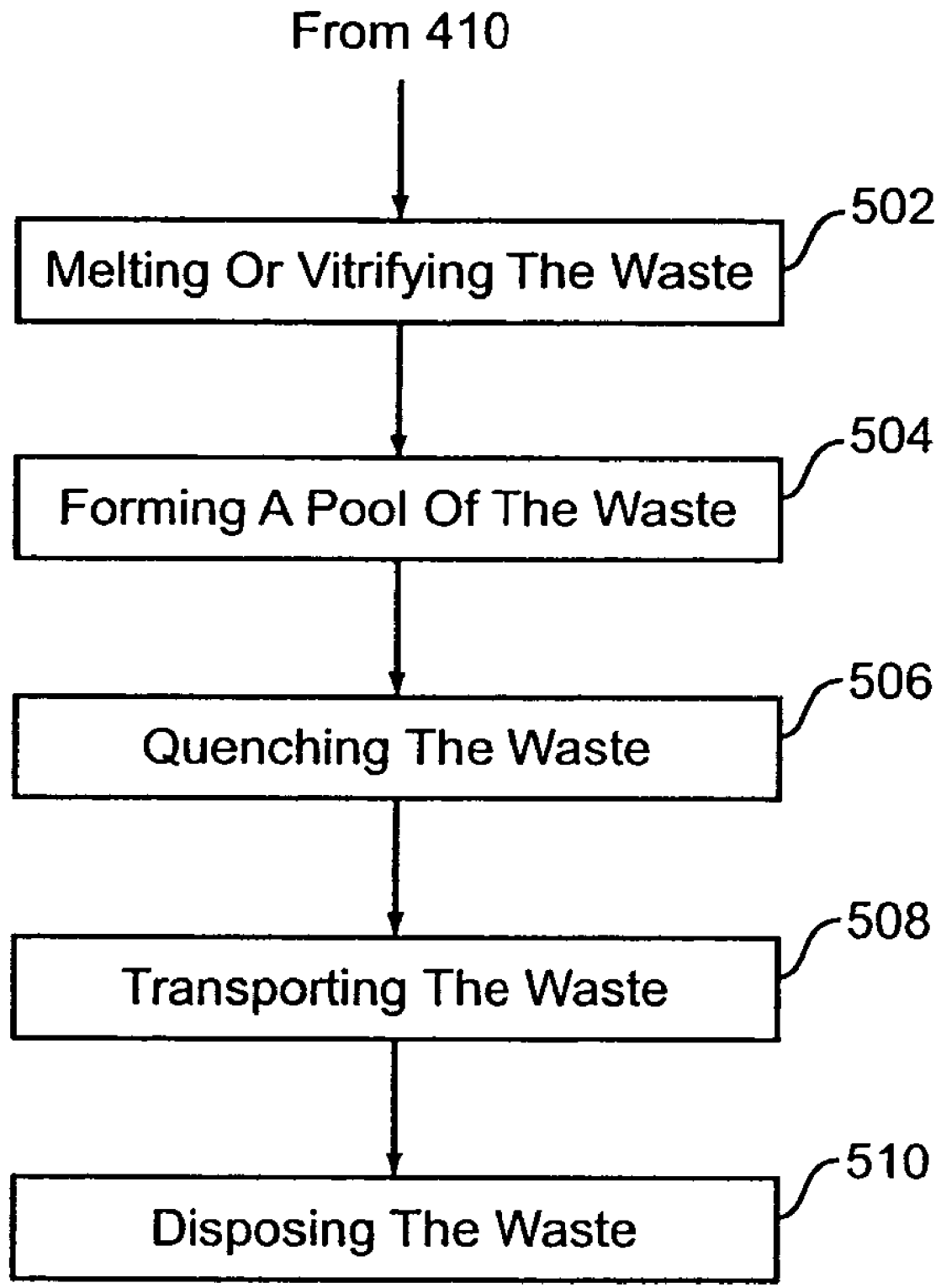
FIG. 5 is a flow diagram of a method for treating waste.

FIG. 5 is a block diagram showing a first exemplary way to treat the waste after the waste is heated. At block 502, the waste is melted or vitrified. At block 504, the waste forms a pool and, at block 506, the waste is quenched. At block 508, the waste is transported and, at block 510, the waste is disposed.

Figure 6A:
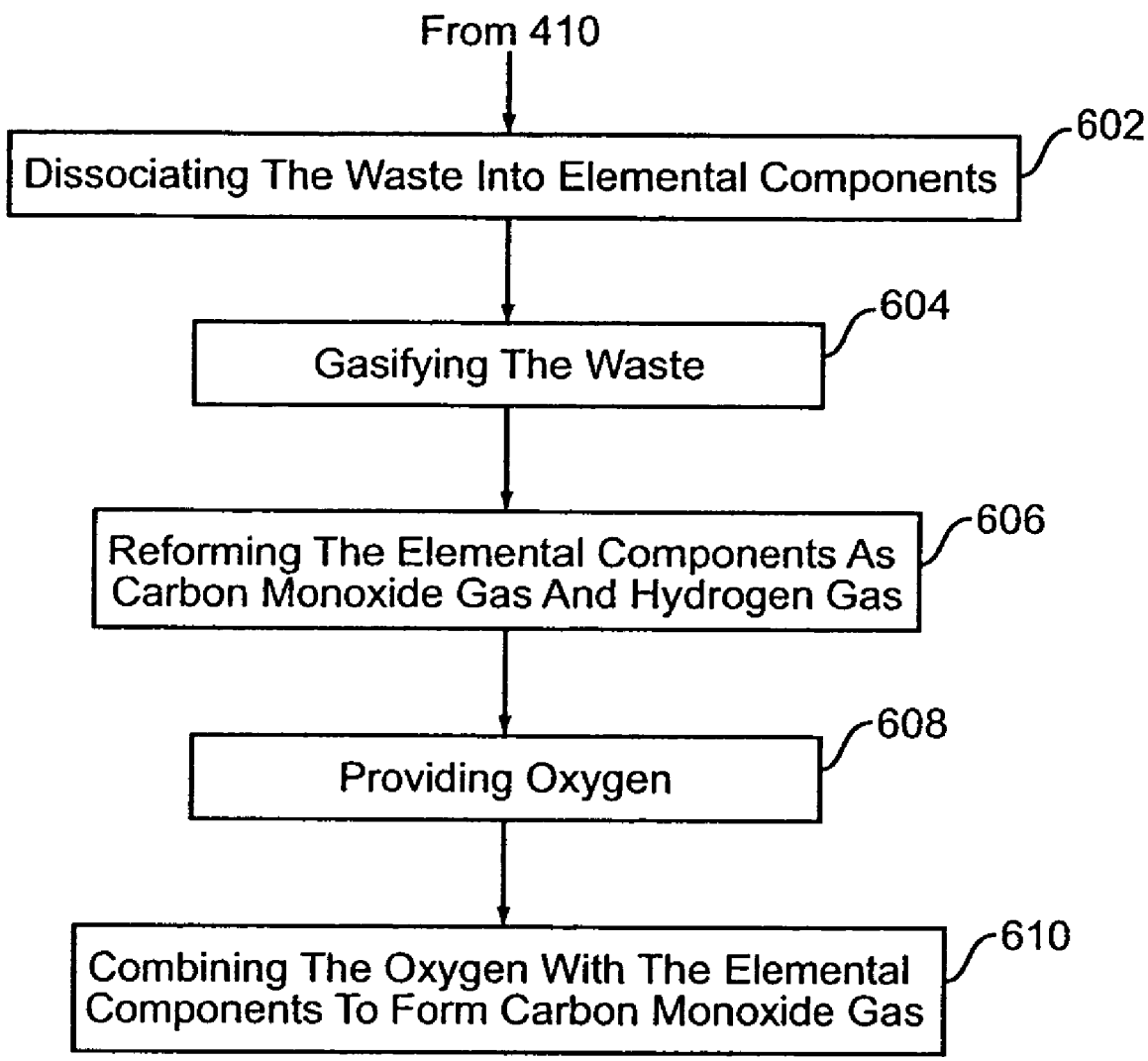
FIGS. 6A and 6B are a flow diagram of a method for treating waste.
Figure 6B:
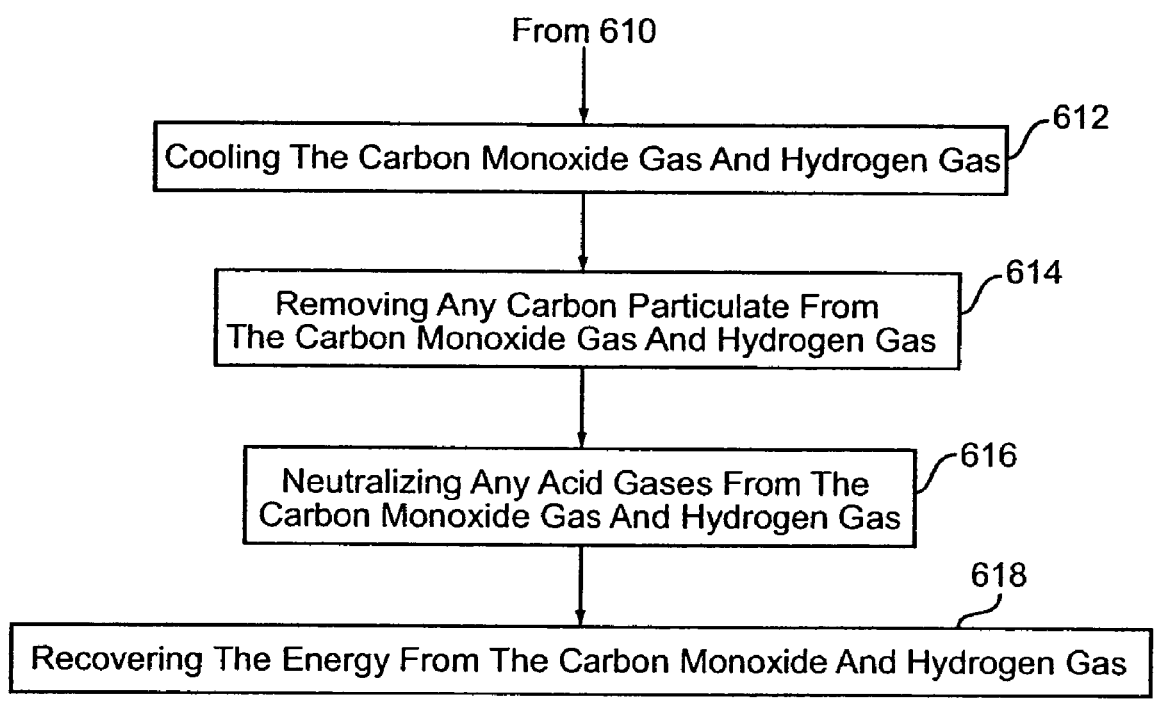

FIGS. 6A and 6B are a block diagram showing a second exemplary way to treat waste after the waste is heated. At block 602, the waste is dissociated into elemental components. This dissociation can destroy the hazardous constituency of at least part of the waste and can be accomplished through pyrolysis of the waste. At block 604, the waste is gasified. At block 606, the elemental components are reformed as carbon monoxide gas and hydrogen gas. At block 608, oxygen is provided and, at block 610, the oxygen is combined with the elemental components to form carbon monoxide gas.

As shown on FIG. 6B, at block 612, the carbon monoxide gas and hydrogen gas is cooled. At block 614, any carbon particulate entrained in the carbon monoxide gas and hydrogen gas is removed. At block 616, any acid gases in the synthesis gas are neutralized. Finally, at block 618, the energy from the carbon monoxide gas and hydrogen gas is recovered.

Figure 7:
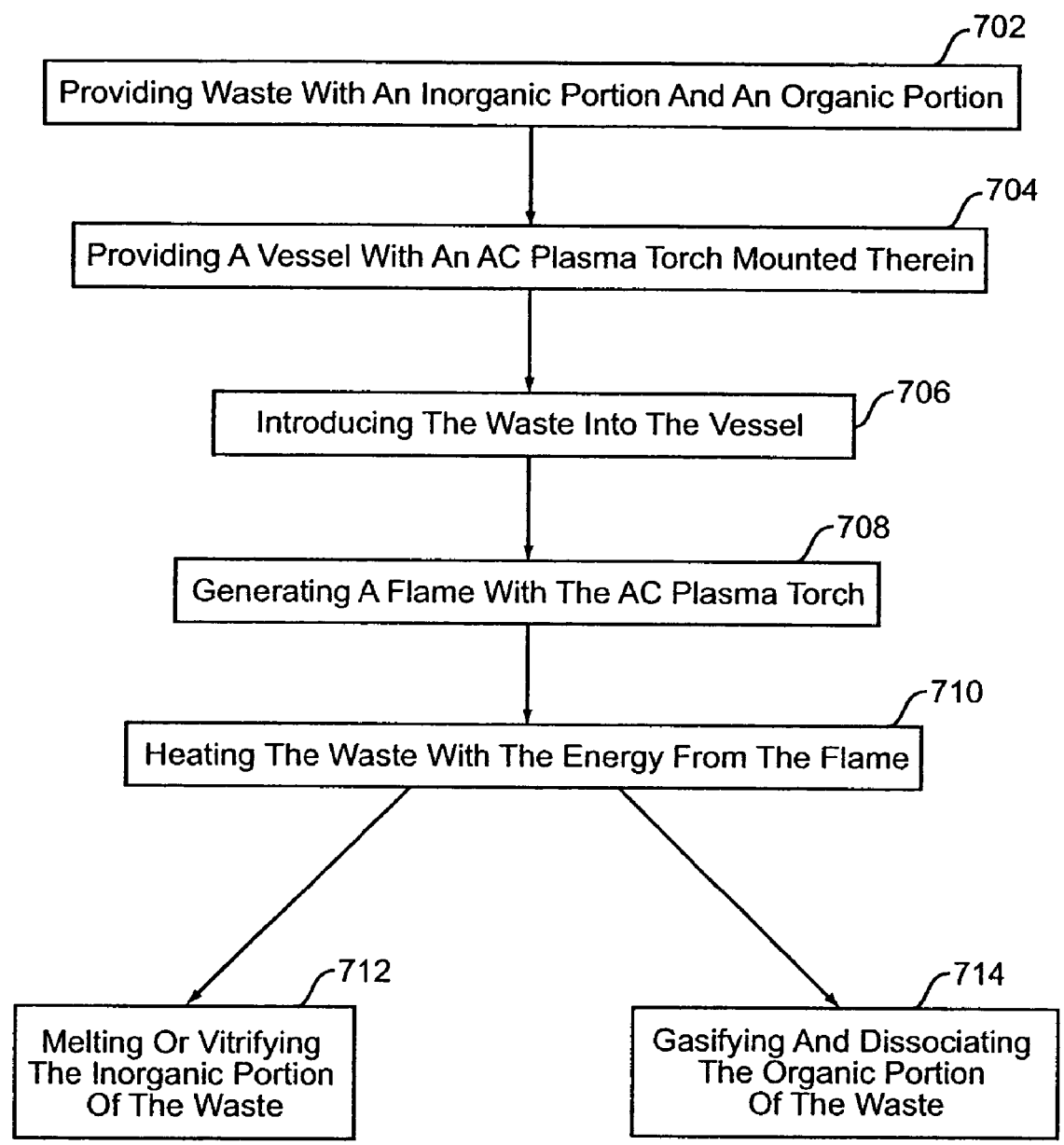
FIG. 7 is a flow diagram of a method for treating waste.

FIG. 7 shows a further exemplary method for treating waste, such as with the waste treatment system 5. At block 702, waste is provided that has an inorganic portion and an organic portion. At block 704, a vessel with an AC plasma torch mounted therein is provided. At block 706, the waste is introduced into the vessel. This can be done at a controlled, continuous rate, or at some other rate.

At block 708, a flame is generated with the AC plasma torch. At block 710, the energy from the flame is used to heat the waste. At block 712, the inorganic portion of the waste is melted or vitrified, for example, as a result of the energy from the flame. At block 714, the organic portion of the waste is gasified and dissociated, for example, as a result of the energy from the flame. The acts of melting or vitrifying the waste and gasifying or dissociating the waste illustrated by blocks 712 and 714 can occur simultaneously or non-simultaneously.

The waste processing system 5 described herein can process a wide variety of hazardous and non-hazardous, inorganic and organic, materials containing varying amounts of moisture, and simultaneously comply with all, most, or some of the applicable air and water emissions standards. The waste treatment system 5 can maintain a constant high temperature in the pyrolysis vessel 20 and control the temperature of the synthesis gas to produce an end product containing minimal hazardous organic molecules and that can be productively used. In addition, the waste treatment system 5 can produce solid residues in the form of glass-contained metals which can pass TCLP tests and, accordingly, can be recycled or reused.

The methods and apparatus described herein can differ from known methods and apparatus involving combustion (incineration). The waste processing system 5 described herein can utilize energy from a torch, such as an AC plasma torch, to thermally decompose waste through pyrolysis (an oxygen-starved process). Incinerators, on the other hand, use combustion to create energy (heat) to propagate the continued destruction of the waste material (an oxygen-required process). In addition, the waste processing system 5 described herein generally does not generate hazardous bottom ash, fly ash, dioxin, or furan, all of which are commonly found in or created by incinerators.

The foregoing description of the invention has been presented to illustrate the principles of the invention and not to limit the invention to any particular embodiment illustrated. It is therefore intended that the foregoing detailed description be regarded as illustrative rather than limiting, and that it be understood that it is the following claims, including all equivalents, that are intended to define the spirit and scope of this invention.

The invention claimed is:

1. An apparatus for treating waste comprising:
   a vessel containing an open space;
   at least two plasma torches mounted with the vessel such that they do not penetrate the open space;
   at least one door that can separate at least one of the plasma torches from the open space in the vessel;
   wherein that at least two plasma torches comprise at least one DC plasma torch and at least one AC plasma torch, and
   wherein at least one of the plasma torches emits a flame which is adjusted according to the waste being treated.

2. The apparatus for treating waste of claim 1 wherein flames from the at least two plasma torches are generated simultaneously.

3. The apparatus for treating waste of claim 1 further comprising a feeding system connected to the vessel comprising a charging hopper and a feeding hopper, wherein the feeding hopper includes an airlock door on a side through which waste can be introduced into the feeding hopper.

4. The apparatus for treating waste of claim 3 further comprising a purging system connected with the feeding system.

5. The apparatus for treating waste of claim 3 further comprising a disinfectant system connected with the feed system.

6. The apparatus for treating waste of claim 5 further comprising at least two taps positioned in the vessel.

7. The apparatus for treating waste of claim 6 further comprising an access and viewing port on the vessel.

8. The apparatus for treating waste of claim 7 further comprising an oxidant within the vessel.

9. An apparatus for treating waste comprising:
a vessel;
at least two plasma torches mounted with the vessel, wherein at least one of the plasma torches emits a flame which is adjusted according to the waste being treated;
a feeding system connected to the vessel comprising a charging hopper and a feeding hopper, wherein the feeding hopper includes an airlock door on a side through which waste can be introduced into the feeding hopper;
a disinfectant system connected with the feed system;
at least two taps positioned in the vessel;
an access and viewing port on the vessel;
an oxidant within the vessel; and
a venturi flow meter connected with the vessel,
wherein the at least two plasma torches comprise at least one DC plasma torch and at least one AC plasma torch.

10. The apparatus for treating waste of claim 9 further comprising:
a quencher connected with the vessel;
a recirculation tank connected with the quencher;
a scrubber connected to the recirculation tank;
a water supply system connected to the recirculation tank; and
a neutralizing agent supply system connected to the recirculation tank.

11. The apparatus for treating waste of claim 10 further comprising:
a wastewater treatment system connected with the recirculation tank; and
a particulate recycling system connected with the wastewater treatment system.

* * * * *

UNITED STATES PATENT AND TRADEMARK OFFICE
CERTIFICATE OF CORRECTION

| | | |
|---|---|---|
| PATENT NO. | : 7,216,593 B2 | Page 1 of 1 |
| APPLICATION NO. | : 11/271573 | |
| DATED | : May 15, 2007 | |
| INVENTOR(S) | : Jose A. Capote et al. | |

It is certified that error appears in the above-identified patent and that said Letters Patent is hereby corrected as shown below:

On the Title Page, item (54), after "FOR TREATING" delete "LIQUID".

On the Title Page 2, Item 56, line 15, after "6,763,772 B2", delete "7/2004" and substitute --4/2004-- in its place.

On the Title Page 2, Item 56, after line 21, insert,
 --US 2005/0204969 A1    9/2003    Gnedenko et al.--.

In column 1, in the title, after "FOR TREATING" delete "LIQUID".

Signed and Sealed this

Seventh Day of August, 2007

JON W. DUDAS
*Director of the United States Patent and Trademark Office*